United States Patent
Hoshiyama et al.

(10) Patent No.: US 12,548,156 B2
(45) Date of Patent: Feb. 10, 2026

(54) MEDICAL IMAGE DIAGNOSTIC APPARATUS

(71) Applicant: CANON MEDICAL SYSTEMS CORPORATION, Otawara (JP)

(72) Inventors: Yutaka Hoshiyama, Nasushiobara (JP); Isao Tatebayashi, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 245 days.

(21) Appl. No.: 18/317,154

(22) Filed: May 15, 2023

(65) Prior Publication Data

US 2023/0377145 A1   Nov. 23, 2023

(30) Foreign Application Priority Data

May 18, 2022   (JP) .................. 2022-081835

(51) Int. Cl.
G06T 7/00 (2017.01)
A61B 6/00 (2024.01)

(52) U.S. Cl.
CPC ............ G06T 7/0012 (2013.01); A61B 6/488 (2013.01); *G06T 2207/20081* (2013.01); *G06T 2207/20084* (2013.01); *G06T 2207/30004* (2013.01)

(58) Field of Classification Search
None
See application file for complete search history.

(56) References Cited

U.S. PATENT DOCUMENTS 7,809,175 B2 * 10/2010 Roehrig .................. G06T 7/223
382/128
2021/0027883 A1 * 1/2021 Kumar ................... G16H 40/20
2021/0106252 A1 * 4/2021 Shinkai ................... A61B 5/055
2023/0042435 A1 * 2/2023 Nakata ................... H04N 23/73
2025/0061704 A1 * 2/2025 Sakurai ................... G06V 10/42

FOREIGN PATENT DOCUMENTS

| JP | 2010-125329 A | 6/2010 |
| JP | 2014-104361 A | 6/2014 |
| JP | 2016-129671 A | 7/2016 |
| JP | 2019-004920 A | 1/2019 |
| JP | 2021-39742 A | 3/2021 |
| WO | WO 2015/162694 A1 | 10/2015 |

OTHER PUBLICATIONS

Office Action issued Oct. 21, 2025, in corresponding Japanese Patent Application No. 2022-081835, citing documents 15-19 therein, 5 pages.

* cited by examiner

*Primary Examiner* — Helen Zong
(74) *Attorney, Agent, or Firm* — Oblon, McClelland, Maier & Neustadt, L.L.P.

(57) ABSTRACT

In one embodiment, a medical image diagnostic apparatus includes: a scanner configured to perform a pre-scan of an object and a diagnostic scan of the object after the pre-scan; and processing circuitry. This processing circuitry is configured to: generate a positioning image from data acquired by the pre-scan and a diagnostic image from data acquired by the diagnostic scan; generate a normal positioning image from the generated positioning image when it is an abnormal positioning image having an abnormality, the normal positioning image being an image in which the abnormality is corrected; and determine an imaging plane of the diagnostic scan from the normal positioning image.

9 Claims, 12 Drawing Sheets

MEDICAL IMAGE DIAGNOSTIC APPARATUS

CROSS-REFERENCE TO RELATED APPLICATION

This application is based upon and claims the benefit of priority from Japanese Patent Application No. 2022-081835, filed on May 18, 2022, the entire contents of which are incorporated herein by reference.

FIELD

Disclosed embodiments relate to a medical image diagnostic apparatus.

BACKGROUND

A magnetic resonance imaging (MRI) apparatus is an imaging apparatus that excites nuclear spin of an object (e.g., a patient) placed in a static magnetic field by application of a radio frequency (RF) pulse having the Larmor frequency and reconstructs an image on the basis of magnetic resonance (MR) signals emitted from the object due to the excitation.

In imaging using a medical image diagnostic apparatus (i.e., so-called modality apparatus) such as an MRI apparatus, an X-ray CT apparatus, and an ultrasonic diagnostic apparatus, a standard imaging plane for diagnosing the object (or examinee) may be determined in advance.

For example, an OM line (orbitomeatal baseline) and an RB line (Reid's baseline) are known as reference lines for defining a standard imaging plane for diagnosis of the head.

The OM line is a reference line connecting the center of the orbit and the center of the ear canal, and the plane (i.e., reference plane) including the right and left reference lines is determined as the imaging plane. The OM line is said to be suitable for cerebral diagnosis.

The RB line is a reference line connecting the inferior margin of the orbit and the upper margin of the ear canal, and the plane (i.e., reference plane) including the right and left reference lines is determined as the imaging plane. The RB line is also called the Frankfurt line, and is said to be suitable for diagnosing the orbit, the accessory nasal sinus, and the skull base, for example.

In addition, for example, as standard imaging planes for cardiac diagnosis, known six standard cross-sections include: a vertical long-axis plane; a horizontal long-axis plane; a short-axis plane; a four-chamber plane; a three-chamber plane; and a two-chamber plane.

In an MRI apparatus and/or an X-ray CT apparatus, imaging for acquiring a positioning image is often performed prior to diagnostic imaging for acquiring diagnostic images corresponding to the above-described standard imaging planes. A positioning image is also called a scanogram, a scout image, or a locator image.

Nowadays, the above-described standard imaging planes or the reference lines for defining the imaging plane can be automatically determined by detecting anatomical feature points of the object from the positioning image, which is generated before performing an imaging for diagnosis.

However, when an abnormality is present in the positioning image, the above-described standard imaging planes and the reference lines cannot be determined correctly. For example, when information necessary for detecting the anatomical feature points is missing due to a metal artifact and/or special diseases and/or a motion artifact making the anatomical feature points difficult to be positionally detected, the standard imaging planes and the reference lines cannot be determined correctly. In such cases, it is necessary to manually correct the positioning image, which requires extra time and effort.

DETAILED DESCRIPTION

Hereinafter, medical image diagnostic apparatuses according to embodiments of the present invention will be described by referring to the accompanying drawings.

In one embodiment, a medical image diagnostic apparatus includes: a scanner configured to perform a pre-scan of an object and a diagnostic scan of the object after the pre-scan; and processing circuitry. This processing circuitry is configured to: generate a positioning image from data acquired by the pre-scan and a diagnostic image from data acquired by the diagnostic scan; generate a normal positioning image from the generated positioning image when it is an abnormal image having an abnormality, the normal positioning image being an image in which the abnormality is corrected; and determine an imaging plane of the diagnostic scan from the normal positioning image.

(Configuration)

Medical image diagnostic apparatuses of respective embodiments include various medical image diagnostic apparatuses (i.e., so-called modality apparatuses) such as an MRI apparatus, an X-ray CT apparatus, an X-ray angiography apparatus, and an ultrasonic diagnostic apparatus. However, in the following, a description will be given of an MRI apparatus 1 as the medical image diagnostic apparatus.

Figure 1:
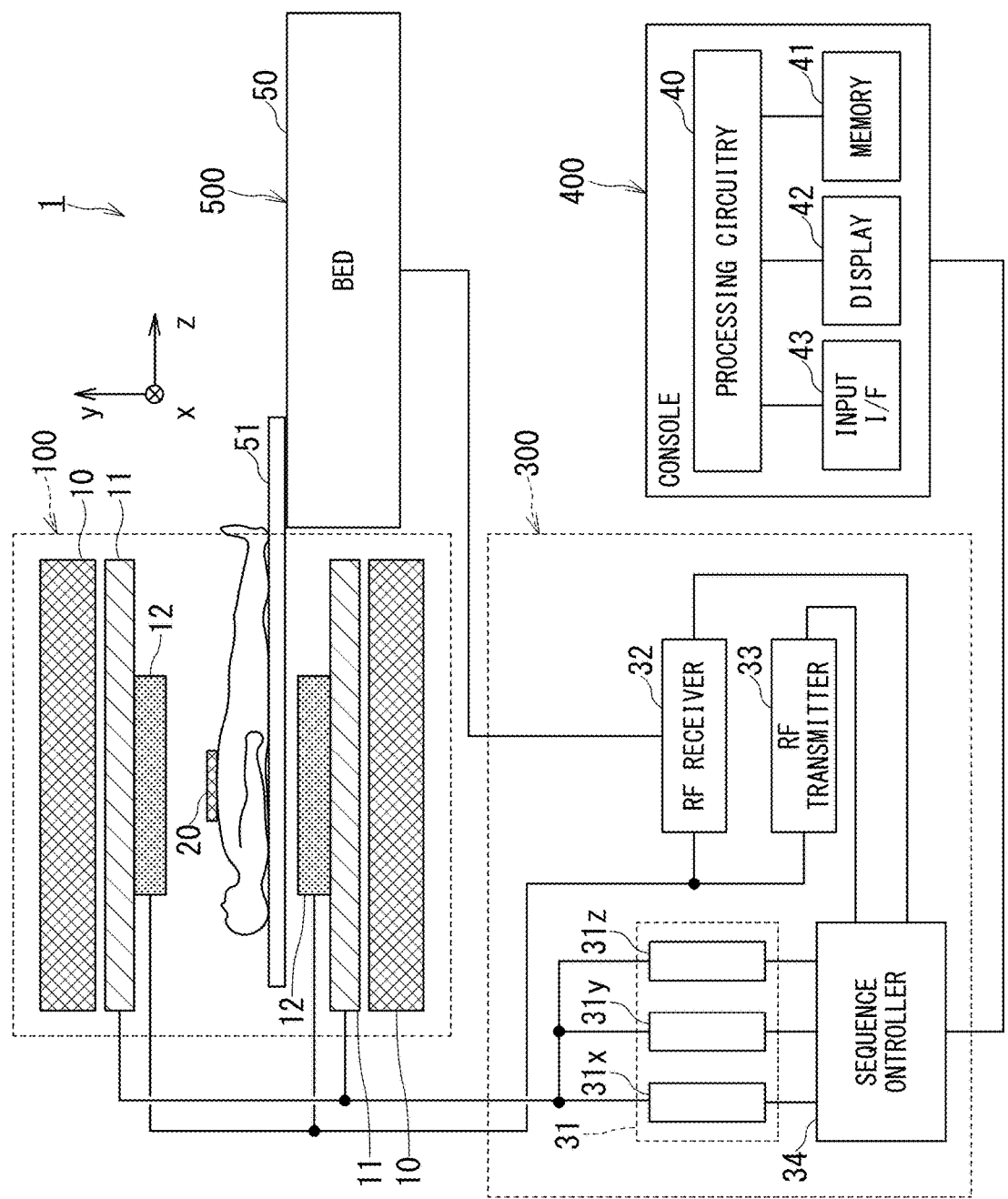
FIG. 1 is a schematic diagram illustrating an overall configuration of an MRI apparatus as one aspect of a medical image diagnostic apparatus according to one embodiment.

FIG. 1 is a block diagram illustrating the overall configuration of the MRI apparatus 1. The MRI apparatus 1 includes a gantry 100, a control cabinet 300, a console 400, and a bed 500, for example.

The gantry 100 includes a static magnetic field magnet 10, a gradient coil 11, and a whole body (WB) coil 12, and these components are housed in a cylindrical housing. The bed 500 includes a bed body 50 and a table 51. The MRI apparatus 1 includes at least one local coil 20 (i.e., RF coil or surface coil) to be disposed close to an object.

The control cabinet 300 includes three gradient coil power supplies 31 ($31x$ in X-axis direction, $31y$ in Y-axis direction, and $31z$ in Z-axis direction), an RF receiver 32, an RF transmitter 33, and a sequence controller 34.

The static magnetic field magnet 10 of the gantry 100 is substantially in the form of a cylinder and generates a static magnetic field inside a bore, which is a space inside the cylindrical structure of the static magnetic field magnet and is also an imaging region of an object such as a patient. The static magnetic field magnet 10 includes a superconducting coil inside, and the superconducting coil is cooled down to an extremely low temperature by liquid helium. The static magnetic field magnet 10 generates a static magnetic field by supplying the superconducting coil with an electric current provided from a static magnetic field power supply (not shown) in an excitation mode. Afterward, the static magnetic field magnet 10 shifts to a permanent current mode, and the static magnetic field power supply is disconnected. Once it enters the permanent current mode, the static magnetic field magnet 10 continues to generate a strong static magnetic field for a long time, for example, over one year. Note that the static magnetic field magnet 10 may be configured as a permanent magnet.

The gradient coil 11 is also substantially in the form of a cylinder and is fixed to the inside of the static magnetic field magnet 10. This gradient coil 11 applies gradient magnetic fields to the object in the respective X-axis, the Y-axis, and the Z-axis directions by using electric currents supplied from the respective gradient coil power supplies $31x$, $31y$, and $31z$.

The bed body 50 of the bed 500 can move the table 51 in the vertical direction and moves the table 51 with the object placed thereon to a predetermined height before imaging. Afterward, when the object is imaged, the bed body 50 moves the table 51 in the horizontal direction so as to move the object to the inside of the bore.

The WB coil 12 is shaped substantially in the form of a cylinder so as to surround the object and is fixed to the inside of the gradient coil 11. The WB coil 12 applies RF pulses transmitted from the RF transmitter 33 to the object, and receives MR signals emitted from the object due to excitation of hydrogen nuclei.

The local coil 20 receives MR signals emitted from the object at a position close to the object. The local coil 20 is configured as an array coil in which a plurality of coil elements are arrayed, for example. There are various types of local coils 20 depending on the anatomical imaging part of the object, such as the head, the chest, the spine, the lower limbs, and the whole body. FIG. 1 illustrates the local coil for imaging the chest.

The RF transmitter 33 transmits each RF pulse to the WB coil 12 on the basis of an instruction from the sequence controller 34. The RF receiver 32 receives MR signals detected by the WB coil 12 and/or the local coil 20, and transmits raw data generated by digitizing the detected MR signals to the sequence controller 34.

The sequence controller 34 performs a scan of the object by driving the gradient coil power supplies 31, the RF transmitter 33, and the RF receiver 32 under the control of the console 400. When the sequence controller 34 receives the raw data from the RF receiver 32 by the scan, the sequence controller 34 transmits the raw data to the console 400.

The sequence controller 34 includes processing circuitry (not shown). This processing circuitry is configured as a processor, which executes predetermined programs, or is configured as hardware such as a field programmable gate array (FPGA) and an application specific integrated circuit (ASIC), for example.

The console 400 is configured as a computer that includes processing circuitry 40, a memory 41, a display 42, and an input I/F (interface) 43.

The memory 41 is a recording medium including a read-only memory (ROM) and/or a random access memory (RAM) in addition to an external memory device such as a hard disk drive (HDD) and an optical disc device. The memory 41 stores various programs to be executed by the processor of the processing circuitry 40 as well as various data and information.

The input I/F 43 includes various devices for an operator to input various data and information, and is configured of a mouse, a keyboard, a trackball, and/or a touch panel, for example.

The display 42 is a display device such as a liquid crystal display panel, a plasma display panel, and an organic EL panel.

The processing circuitry 40 is a circuit provided with a central processing unit (CPU) and/or a special-purpose or general-purpose processor, for example. The processor implements various functions described below by executing the programs stored in the memory 41. The processing circuitry 40 may be configured of hardware such as an FPGA and an ASIC. The various functions described below can also be implemented by such hardware. Additionally, the processing circuitry 40 can implement the various functions by combining hardware processing and software processing based on its processor and programs.

Figure 2:
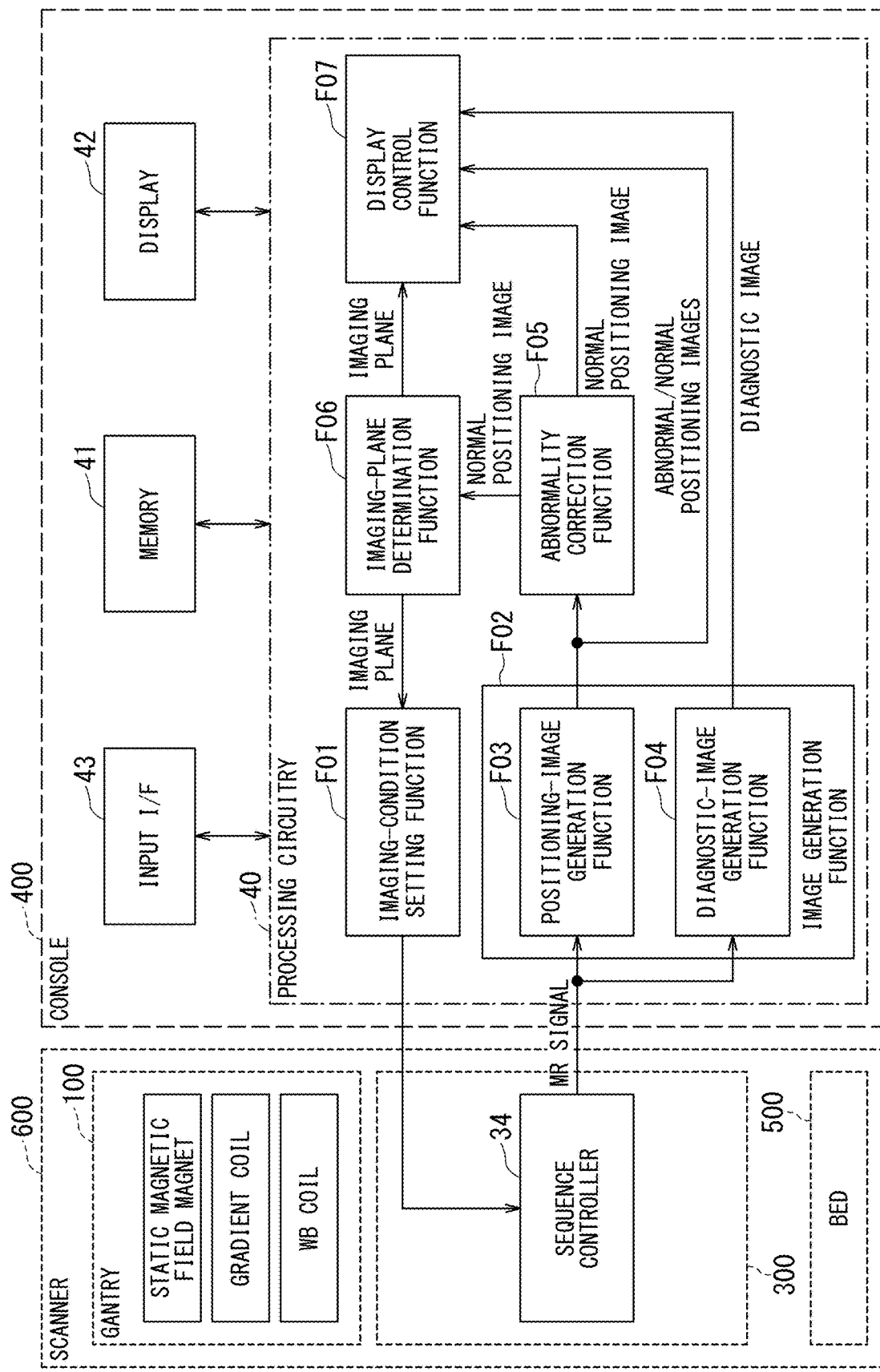
FIG. 2 is a block diagram of the MRI apparatus of the present embodiment and is also a functional block diagram focusing on functions to be implemented by processing circuitry.

FIG. 2 is a block diagram of the MRI apparatus 1 according to the present embodiment, especially a functional block diagram focusing on the functions implemented by the processing circuitry 40.

Of all the components of the MRI apparatus 1 shown in FIG. 1, the components except the console 400 (i.e., the control cabinet 300, the gantry 100, and the bed 500) are collectively referred to as a scanner 600 in FIG. 2.

As shown in FIG. 2, the processing circuitry 40 of the MRI apparatus 1 implements each of: an imaging-condition setting function F01, an image generation function F02 composed of a positioning-image generation function F03 and a diagnostic-image generation function F04, an abnormality correction function F05, an imaging-plane determination function F06, and a display control function F07.

The imaging-condition setting function F01 sets imaging conditions on the sequence controller 34, and the imaging conditions include the type of pulse sequence of a diagnostic scan for acquiring MR signals of a diagnostic image of the object such as a patient, and various parameters for defining the pulse sequence, for example. The various parameters for defining the pulse sequence also include parameters related to the position and orientation of the imaging plane of the diagnostic image.

The imaging-condition setting function F01 also sets various parameters of a pulse sequence of a pre-scan on the sequence controller 34, and the pre-scan is performed prior to the diagnostic scan to acquire MR signals for a positioning image.

The image generation function F02 generates diagnostic images and positioning images. The diagnostic images or the positioning images generated by the image generation function F02 include not only two-dimensional display images displayed on the display 42 but also three-dimensional image data for generating a two-dimensional display image by, for example, rendering.

Of the image generation function F02, the positioning-image generation function F03 reconstructs data (i.e., MR signals) acquired by the pre-scan so as to generate a positioning image. The positioning image may be three-dimensional image data reconstructed as three-dimensional volume data or may be three-dimensional image data generated by stacking a plurality of slice images reconstructed as two-dimensional images.

The diagnostic-image generation function F04 generates diagnostic images for diagnosing the object from the data (i.e., MR signals) acquired in the diagnostic scan.

When an abnormality is present in the positioning image, the abnormality correction function F05 generates a normal positioning image, in which the abnormality is corrected, from the abnormal positioning image. The imaging-plane determination function F06 determines the imaging plane used for the diagnostic scan from the normal positioning image in which the abnormality is corrected. Details of the operation of the abnormality correction function F05 and the imaging-plane determination function F06 will be described below.

The display control function F07 causes the display 42 to display diagnostic images generated by the diagnostic-image generation function F04 and/or an imaging-plane-determined image. Note that the imaging-plane-determined image is an image in which the imaging plane determined by the imaging-plane determination function F06 or the reference line for determining the imaging plane is superimposed on the positioning image generated by the positioning-image generation function F03.

In addition, the display control function F07 may cause the display 42 to display the initial or original positioning image generated by the positioning-image generation function F03 and/or the normal positioning image in which the abnormality is corrected by the abnormality correction function F05.

Prior to description of the abnormality correction function F05 and the imaging-plane determination function F06 of the medical image diagnostic apparatus 1 (or MRI apparatus 1) according to the present embodiment, a description will be given of the conventional imaging-plane determination method using the positioning image and its problem by referring to FIG. 3 to FIG. 4B.

As described above, in imaging using a medical image diagnostic apparatus such as an MRI apparatus, an X-ray CT apparatus, and an ultrasonic diagnostic apparatus, a standard imaging plane for diagnosing the object is determined in advance. For example, the OM line (Orbitomeatal baseline) and the RB line (Reid's baseline) are known as the reference lines for defining a standard imaging plane for diagnosing the head. The OM line is the reference line connecting the center of the orbit and the center of the ear canal, and the plane (i.e., reference plane) including the right and left reference lines is determined as the imaging plane. The RB line is a reference line connecting the inferior margin of the orbit and the upper margin of the ear canal, and the plane (i.e., reference plane) including the right and left reference lines is determined as the imaging plane. The RB line is also called the Frankfurt line. In addition, for example, as the standard imaging planes for cardiac diagnosis, the known six standard cross-sections include: a vertical long-axis plane; a horizontal long-axis plane; a short-axis plane; a four-chamber plane; a three-chamber plane; and a two-chamber plane.

In the MRI apparatus and/or the X-ray CT apparatus, the pre-scan is performed to acquire at least one positioning image prior to the diagnostic scan in which MR signals for diagnosis images are acquired using the above-described standard imaging planes. A user sets or designates a desired reference line and/or a imaging plane to be imaged as a diagnostic image via, for example, the input I/F 43. Afterward, the MRI apparatus or the X-ray CT apparatus detects an anatomical structure or anatomical feature points of the object from the acquired positioning image, and then automatically determines the designated imaging plane or the reference line for defining the imaging plane on the basis of the detected anatomical structure or respective positions of the anatomical feature points.

Figure 3:
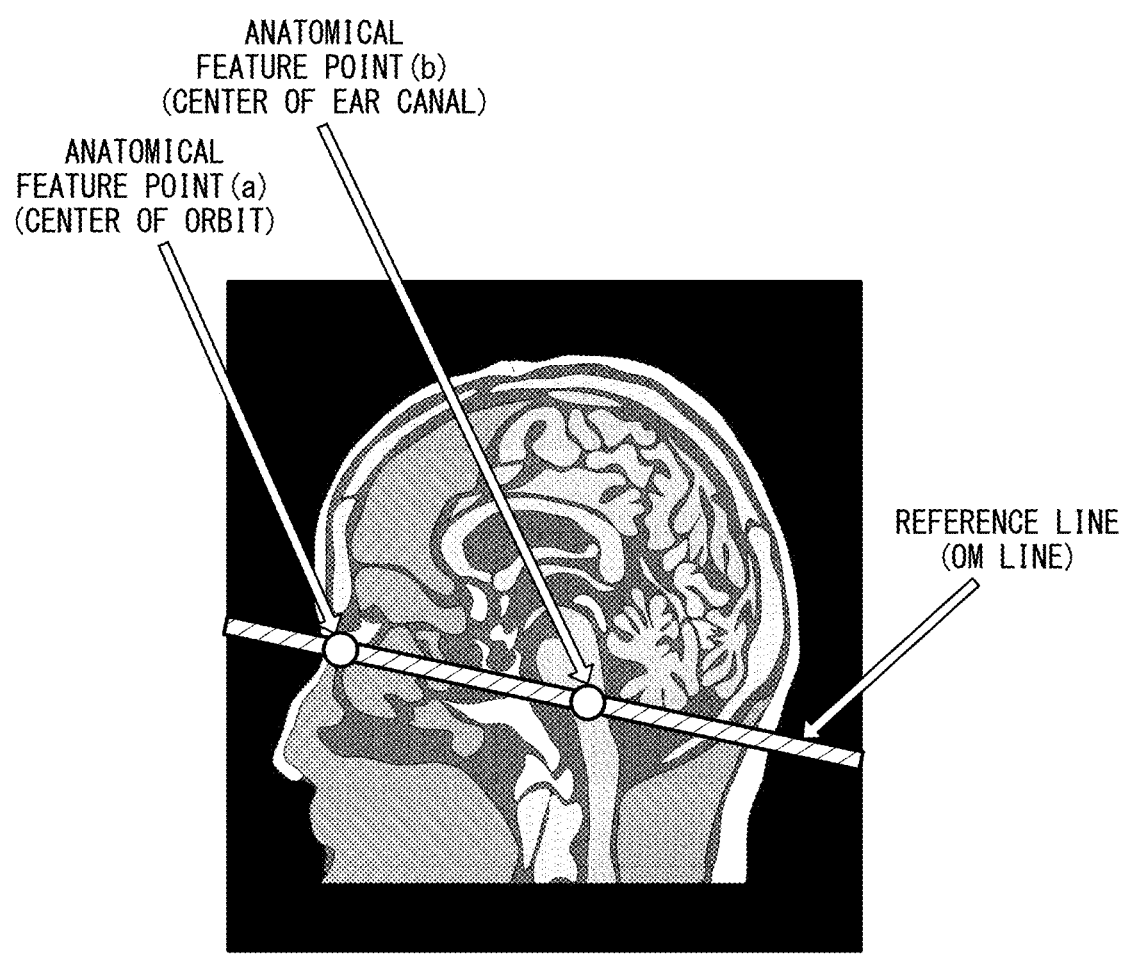
FIG. 3 is a schematic diagram illustrating a conventional imaging-plane determination method using a positioning image.
Figure 4:
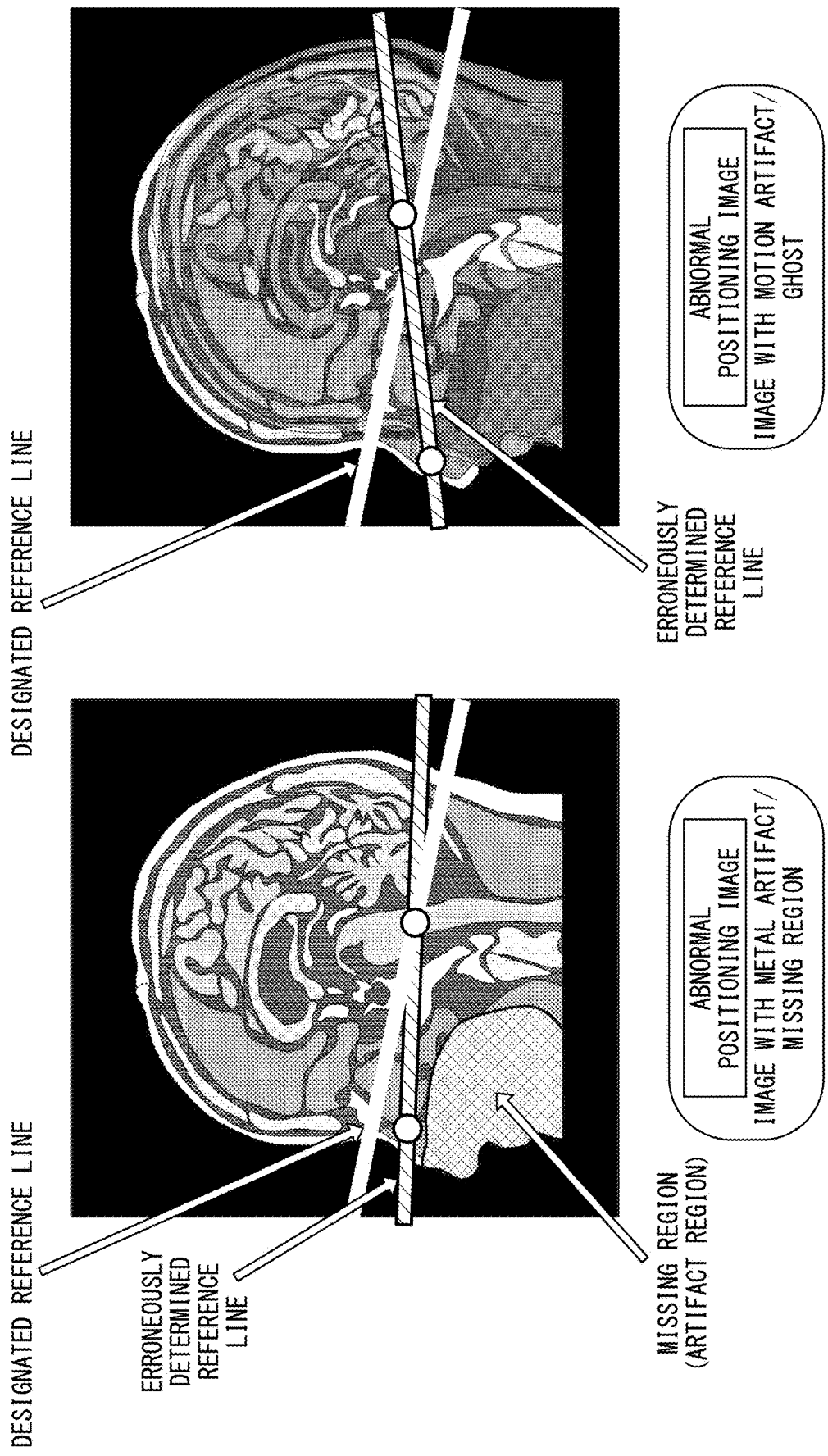
FIG. 4A and FIG. 4B are schematic diagrams illustrating a problem of the conventional imaging-plane determination method using the positioning image.

In FIG. 3, the OM line automatically determined from the positioning image of the head acquired by the MRI apparatus 1 is superimposed on a sagittal plane image of the head. In order to automatically determine the OM line, a plurality of anatomical structures or anatomical feature points are detected from the positioning image as three-dimensional image data of the head. From at least two anatomical feature points, for example, from an anatomical feature point (a) (e.g., a center of the orbit) and an anatomical feature point (b) (e.g., a center of the ear canal), the straight line connecting both points (a) and (b) are determined as the OM line. Further, the plane containing the right and left two OM lines is determined as the imaging plane corresponding to the OM lines.

FIG. 4A and FIG. 4B illustrate the problem of the above-described conventional imaging-plane determination method. In order to accurately determine the imaging plane and the reference line from the positioning image, it is necessary to accurately detect the anatomical structure and the positions of anatomical feature points from the positioning image. For example, in order to accurately determine the OM line, it is necessary to accurately detect the position of the center of the orbit and the position of the center of the ear canal.

However, when an artifact appears in the positioning image, the positions of the anatomical structure and the anatomical features cannot be accurately detect due to the artifact, and can be erroneously detected.

For example, as shown in FIG. 4A, metallic dentures may cause a metal artifact in the positioning image, which may result in occurrence of a missing region (or defect region) in the positioning image. In such an abnormal positioning image, the anatomical feature points (for example, the detected position of the center of the orbit may be largely deviated from the correct position, which resultantly leads to determination of an incorrect reference line different from the designated reference line.

Further, for example, as shown in FIG. 4B, if the object moves during imaging, a motion artifact or blur may appear in the positioning image. Additionally, depending on the relative positional relationship between the object and the FOV (Field of View), wrap-around artifacts may occur that brings the positioning image into a ghost image. Also in such an abnormal positioning image where a blur and/or a ghost occurs, there is a possibility that the detected positions of the anatomical feature points largely deviate from their correct positions, which resultantly leads to determination of an incorrect reference line different from the designated reference line.

In order to eliminate such inconvenience, when an abnormality is present in the positioning image, the MRI apparatus 1 of the present embodiment performs abnormality correction processing such that a normal positioning image is presumed or acquired on the basis of the abnormal positioning image.

(Automatic Imaging-Plane Determination Processing)

Figure 5:
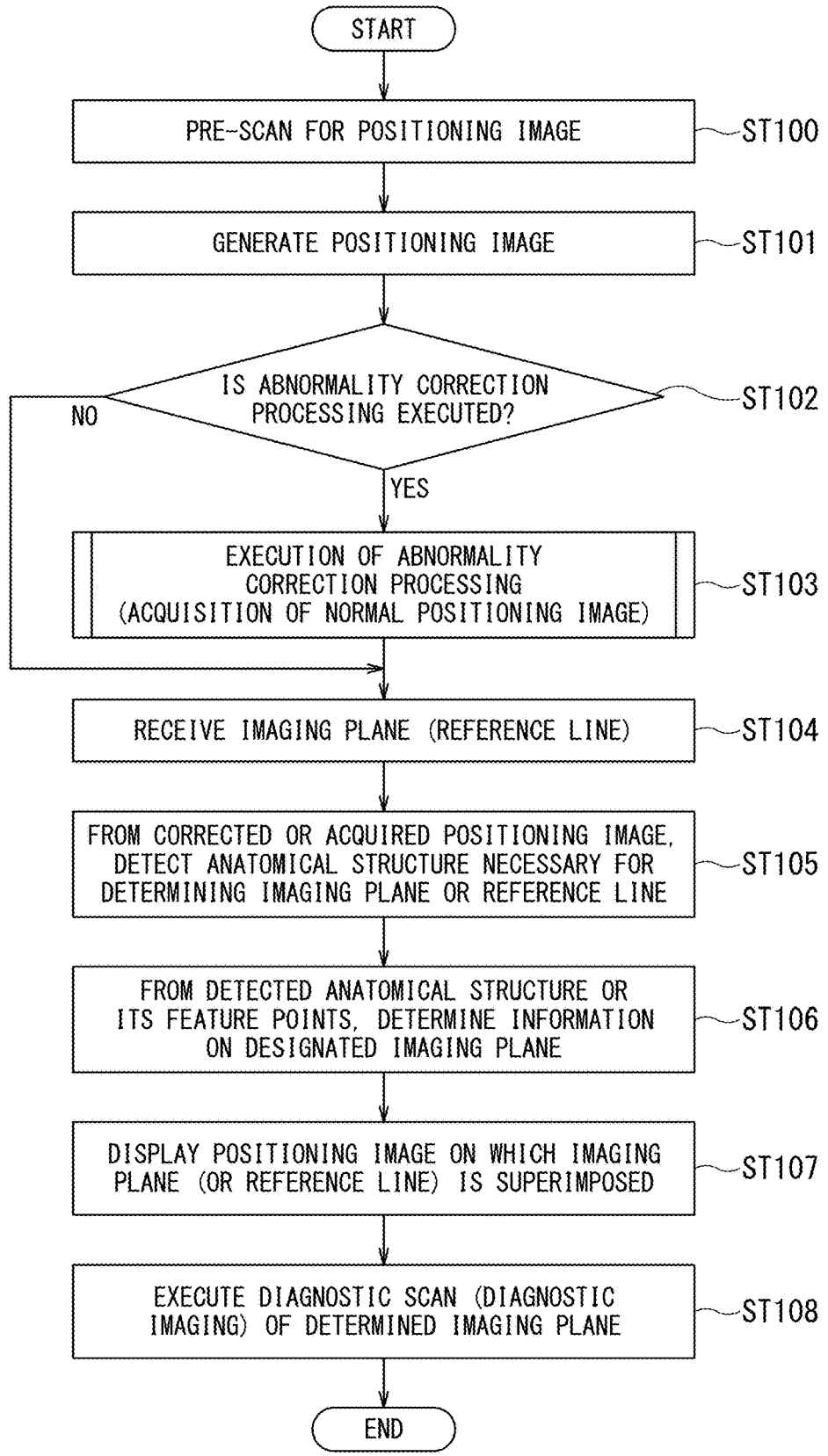
FIG. 5 is a flowchart illustrating operation related to automatic imaging-plane determination processing of the MRI apparatus according to the present embodiment.

FIG. 5 is a flowchart illustrating operation related to automatic imaging-plane determination processing of the MRI apparatus 1. Hereinafter, the operation of the MRI apparatus 1 will be described based on the flowchart of FIG. 5, while referring to FIG. 6 to FIG. 12 as required.

In the step ST100, the pre-scan is performed to acquire the positioning image of the object to be diagnosed. The pre-scan is performed by the scanner 600 based on the pulse sequence that is set by the imaging-condition setting function F01 for acquiring the positioning image.

Figure 6:
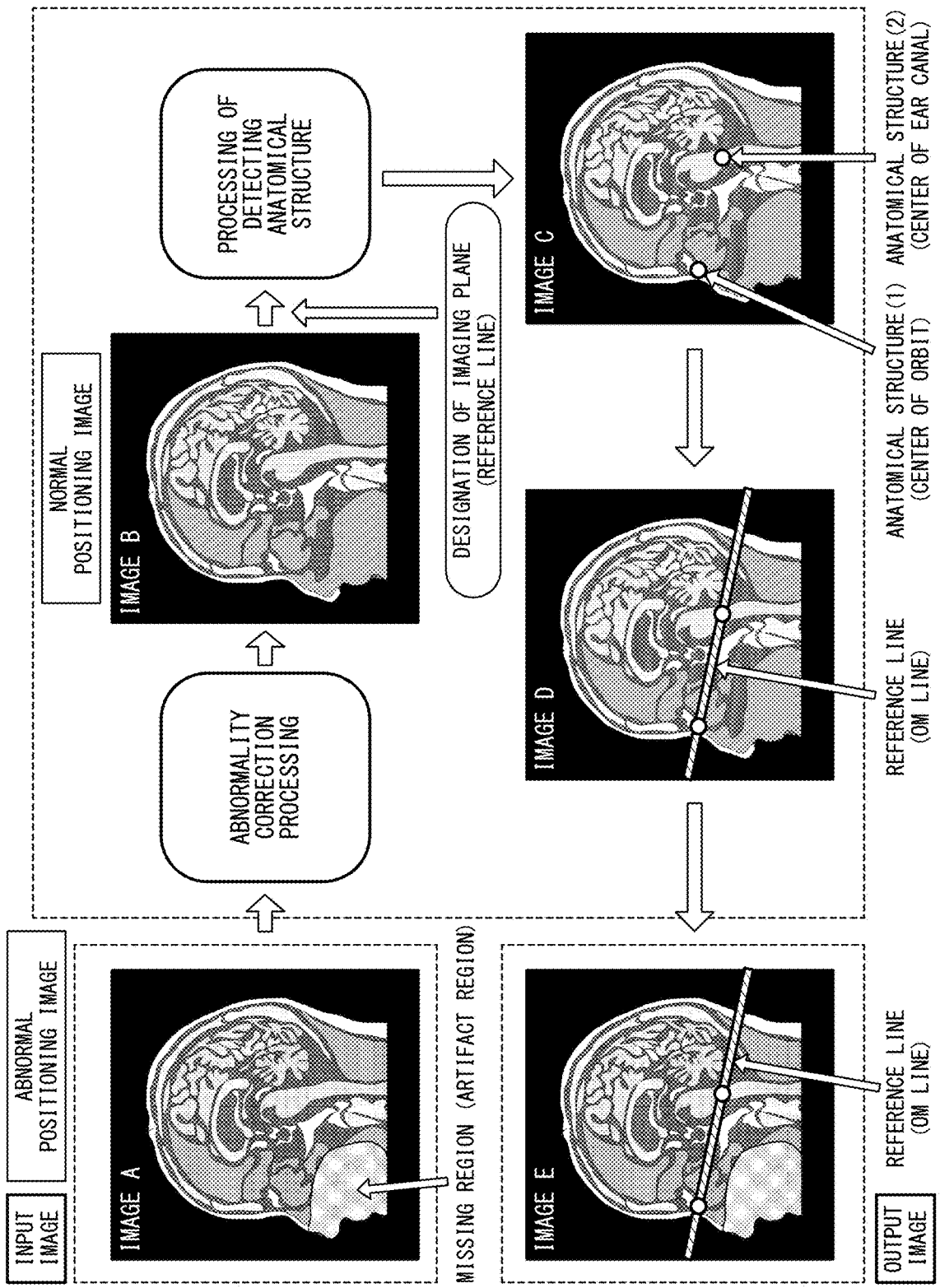
FIG. 6 is a first diagram illustrating a processing concept of the automatic imaging-plane determination processing of the MRI apparatus according to the present embodiment.

In the step ST101, the positioning-image generation function F03 generates the positioning image. The generated positioning image is displayed on, for example, the display 42. The "Image A" shown in the upper left of FIG. 6 illustrates the positioning image of the head imaged by the MRI apparatus 1. Since the positioning image is generated as three-dimensional image data as described above, the image displayed on the display 42 can be any cross-sectional image such as a coronal plane image, an axial plane image, or a sagittal plane image. In the following, a description will be given of the case where the sagittal plane image is displayed and an abnormal positioning image having a missing region (or an artifact region), like the "image A", is used as an input image for automatically determining the imaging plane.

In the step ST102, it is determined whether the abnormality correction processing is performed or not. For example, if an abnormality is present in the positioning image, a message such as "Should abnormality correction processing be performed?" appears on the display 42. In this case, if the user selects execution of the abnormality correction processing through input operation such as a click of a "YES" button, the processing proceeds to the step ST103. If the user chooses not to execute the abnormality correction processing by input operation such as a click of a "NO" button, the processing skips the step ST103 and proceeds to the step ST104.

Even though the abnormality correction processing in the step ST103 can output a normal positioning image regardless of whether the initial positioning image is normal or abnormal, in the case where the positioning image generated in the step ST101 apparently has no abnormality based on the user's judgment, the abnormality correction processing of the step ST103 can be skipped so as to shorten the processing time. In such a case, the user skips the processing of the step ST103 by, for example, clicking the "NO" button.

The determination as to presence/absence of an abnormality in the positioning image may be made automatically by the medical image processing apparatus using machine learning, instead of being made by the user. In this case, in the step ST102, the medical image processing apparatus determines whether an abnormality is present in the positioning image or not, and the processing proceeds to the step ST103 if the determination is affirmative (YES), and the processing proceeds to the step ST104 if the determination is negative (NO).

"Image B" shown in the upper part of FIG. 6 exemplifies a normal positioning image after the abnormal positioning image has been corrected by the abnormality correction processing in step ST103. In the normal positioning image ("image B"), the missing region (or artifact region) present in the abnormal positioning image ("image A") is corrected. The abnormality correction processing in the step ST103 will be specifically described below.

In the step ST104, the processing circuitry 40 receives the reference line or standard imaging planes designated by the user. For example, if the anatomical imaging part is the head, the reference line such as the OM line or the RB line is received. If the anatomical imaging part is the heart, standard imaging planes such as a short-axis plane or a four-chamber plane are received.

The processing of the step ST104 does not necessarily have to be performed after the step ST103 but may be performed at any timing before the step ST105 in the flowchart of FIG. 5. Alternative, the step ST 104 may be performed between the step ST105 and the step ST106, as described below.

In the step ST105, the anatomical structures (or anatomical feature points), which are necessary for determining the designated imaging plane or reference line, are detected from the corrected (or acquired) normal positioning image.

The detection of the anatomical structures (or anatomical feature points) may be performed by using a technique such as pattern matching or by using a trained model such as a DNN (Deep Neural Network) that is generated by machine learning.

In the "Image C" shown in the lower part of FIG. 6, the anatomical structures (or anatomical feature points) detected in the step ST105 are displayed by white circles, which are superimposed on the corrected normal positioning image. In the case of FIG. 6, the OM line has already been designated as the reference line for defining the imaging plane, and thus, in the step ST105, it is sufficient to simply detect the center of the orbit and the center of the ear canal as the feature points of the two anatomical structures (1) and (2) required for determining the OM line.

In the step ST106, from the detected anatomical structures (or its feature points), information on the position and orientation of the designated imaging plane or reference line is determined. In the "Image D" shown in the lower center of FIG. 6, the OM line, which is the reference line determined in this manner, is superimposed on the corrected normal positioning image and displayed.

In the next step ST107, the "Image E" is generated by superimposing the imaging plane and reference line determined in the step ST106 on the initial positioning image (i.e., abnormal positioning image including the abnormal region such as the missing region), and the "Image E" is displayed on the display 42.

The processing of the steps ST105 and ST106 is performed by the imaging-plane determination function F06 of the processing circuitry 40 shown in FIG. 2. The processing of the step ST107 is performed by the display control function F07 of the processing circuitry 40.

It should be noted that, usually, what the user can see through the display 42 is the "Image A" as an input image and the "Image E" as an output image. The "Image B", "Image C", and "Image D" are meant for showing the concept of the processing performed in the processing circuitry 40 and are not displayed on the display 42 in usual cases.

In the step ST108, the diagnostic scan is performed to acquire MR signals for generating a diagnostic image that corresponds to the imaging plane determined in the above-described manner.

Figure 7:
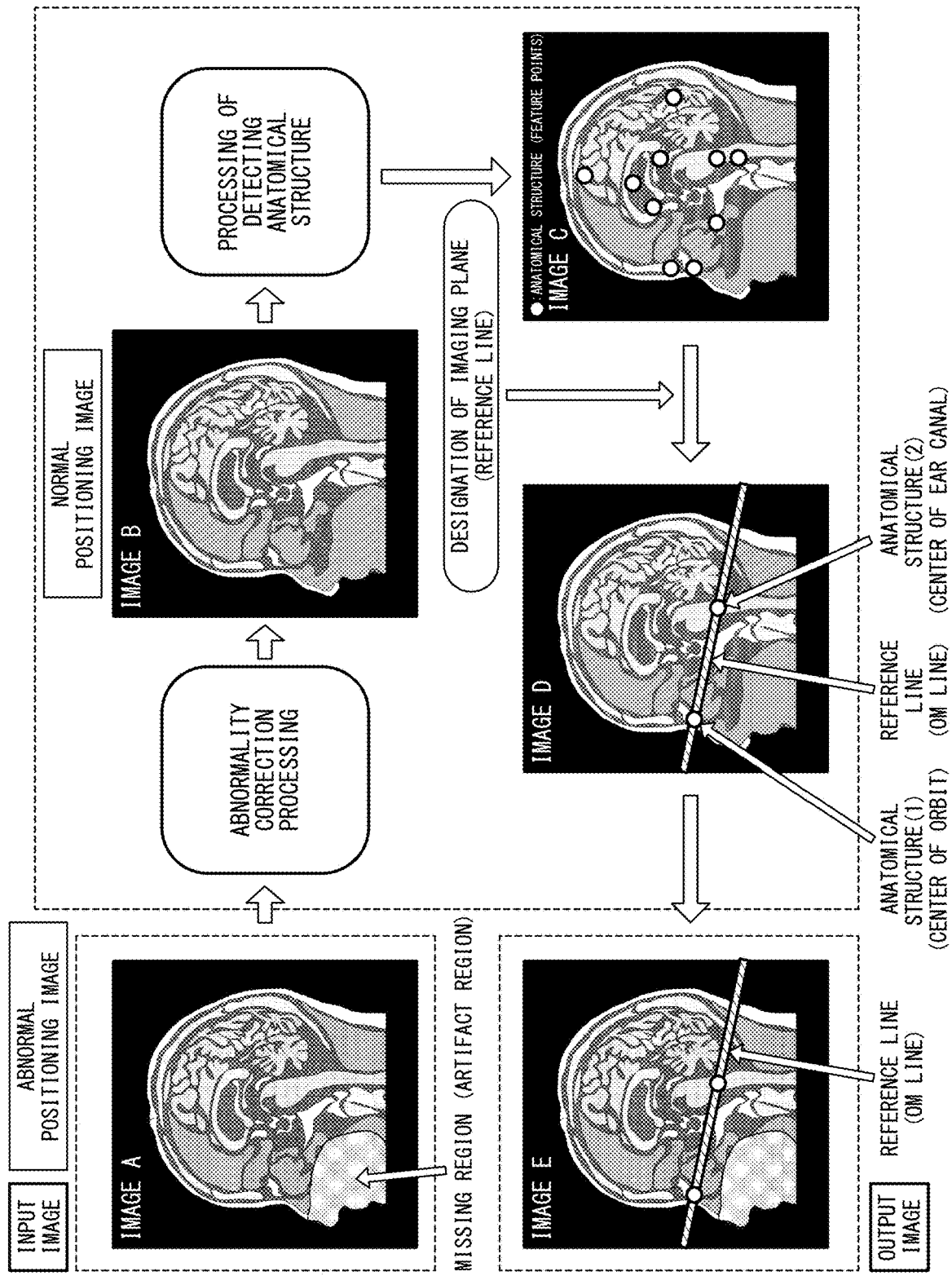
FIG. 7 is a second diagram illustrating the processing concept of the automatic imaging-plane determination processing of the MRI apparatus according to the present embodiment.

FIG. 7 is a schematic diagram illustrating a modification of the processing of detecting the anatomical structure. In this modification, a plurality of anatomical structures (or anatomical feature points) corresponding to a plurality of possible imaging planes or a plurality of possible reference lines are exhaustively detected within a conceivable range. From these anatomical structures (or anatomical feature points), only the anatomical structure(s) (or anatomical feature points) necessary for determining the designated imaging plane or reference line is/are extracted. Based on the extracted anatomical structure(s) (or anatomical feature points), information on the position and orientation of the designated imaging plane or reference line is determined.

In this modification, it is sufficient to have the processing of the step ST104 performed before the step ST106, even after the step ST105 is fine.

(Abnormality Correction Processing)

Next, some examples related to the abnormality correction processing of the step ST103 performed by the MRI apparatus 1 of the present embodiment will be described by referring to FIG. 8 to FIG. 11. The abnormality correction processing described below is performed by, for example, the abnormality correction function F05 of the processing circuitry 40 shown in FIG. 2.

Figure 8:
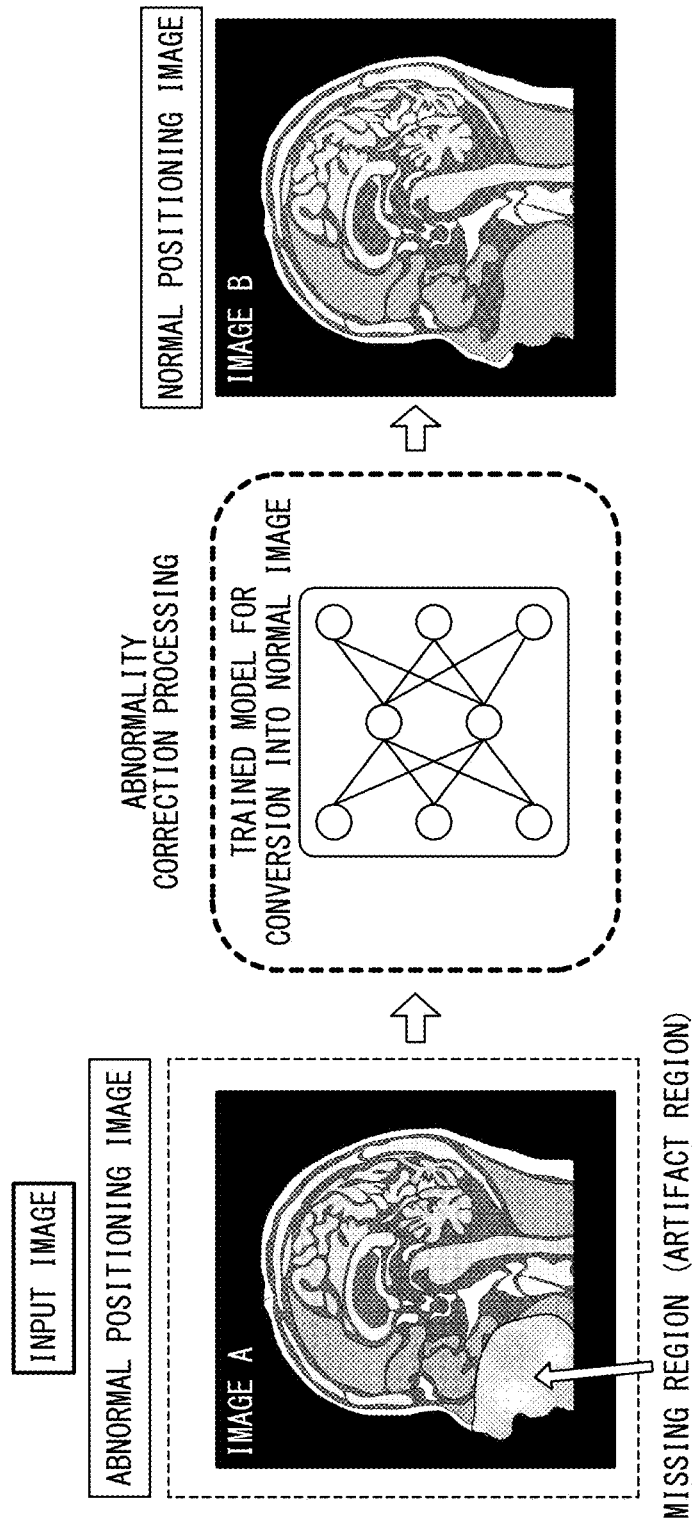
FIG. 8 is a schematic diagram illustrating a concept of abnormality correction processing according to the first example.

FIG. 8 is a schematic diagram illustrating the concept of the abnormality correction processing according to the first example. In the first example, the abnormality correction processing is performed by using a trained model generated by machine learning. In other words, an abnormal positioning image is inputted to a trained model for conversion into a normal image, then the image outputted from the trained model after conversion is treated as a normal positioning image, and thereby a normal positioning image is generated from the abnormal positioning image.

The trained model may be generated by machine learning, in which training datasets composed of a plurality of abnormal positioning images and ground truth datasets composed of a plurality of normal positioning images are used. Alternatively, the trained model may be generated by machine learning in which a plurality of normal positioning images are used to learn what is deemed normal. Although the machine learning model is not particularly limited, a machine learning model using a neural network such as an autoencoder or a GAN (Generative Adversarial Network), or other known machine learning models can be used to generate a trained model for conversion into a normal image.

Note that not only an abnormal positioning image but also a normal positioning image may be inputted to the trained model for conversion into a normal image, and a normal positioning image can be outputted from the trained model.

Figure 9:
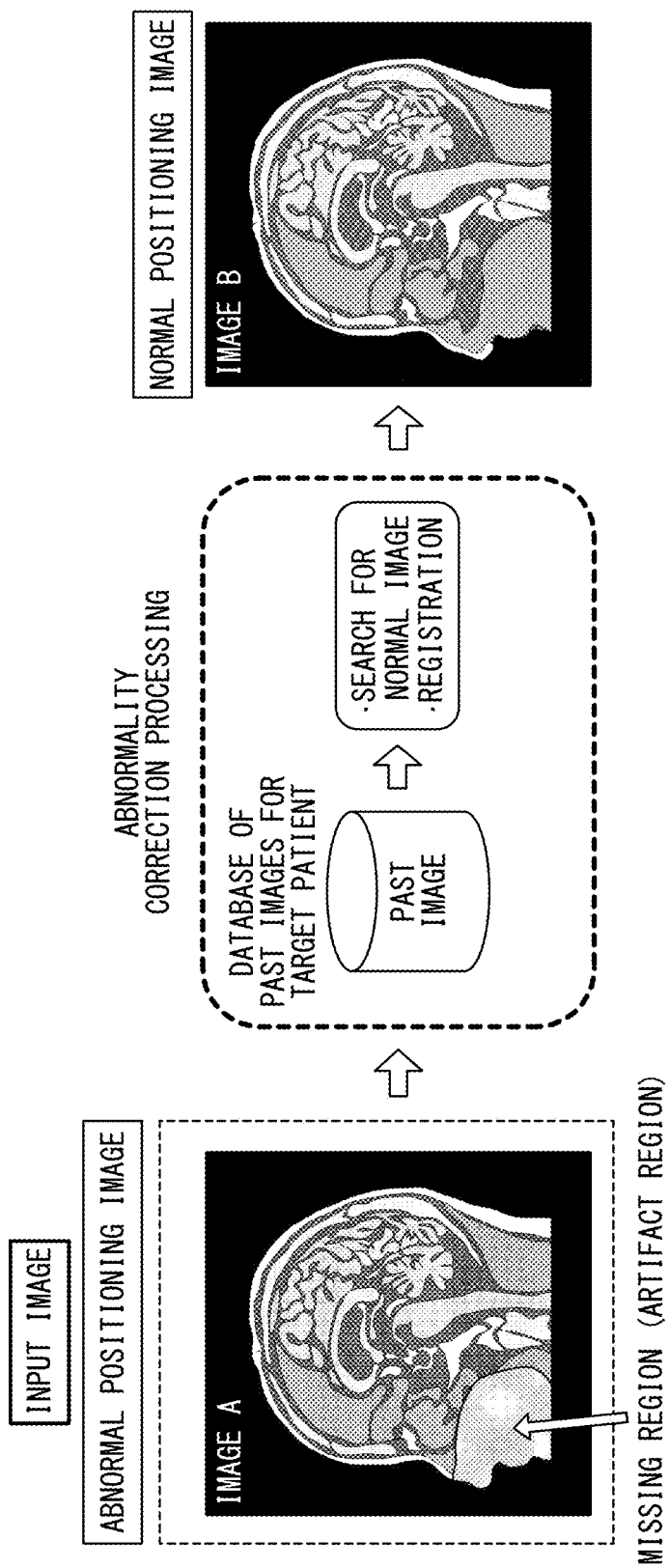
FIG. 9 is a schematic diagram illustrating the concept of the abnormality correction processing according to the second example.

FIG. 9 is a schematic diagram illustrating the concept of the abnormality correction processing according to the second example. In the second example, the abnormality correction processing is performed by using an image database that stores a plurality of past normal images of the same object to be diagnosed.

Specifically, the processing circuitry 40 searches the image database, in which a plurality of normal past images are stored, to extract the normal image corresponding to the abnormal positioning image generated in the step ST101. For example, the processing circuitry 40 extracts the normal past image that is most similar to the abnormal positioning image generated in the step ST101 from this image database. In this way, the extracted normal past image is treated as the corrected normal positioning image.

When misregistration or misalignment is present between the normal positioning image extracted from the image database and the abnormal positioning image generated in the step ST101, the extracted normal positioning image may be subjected to alignment processing (or registration processing) so as to positionally match the abnormal positioning image.

Figure 10:
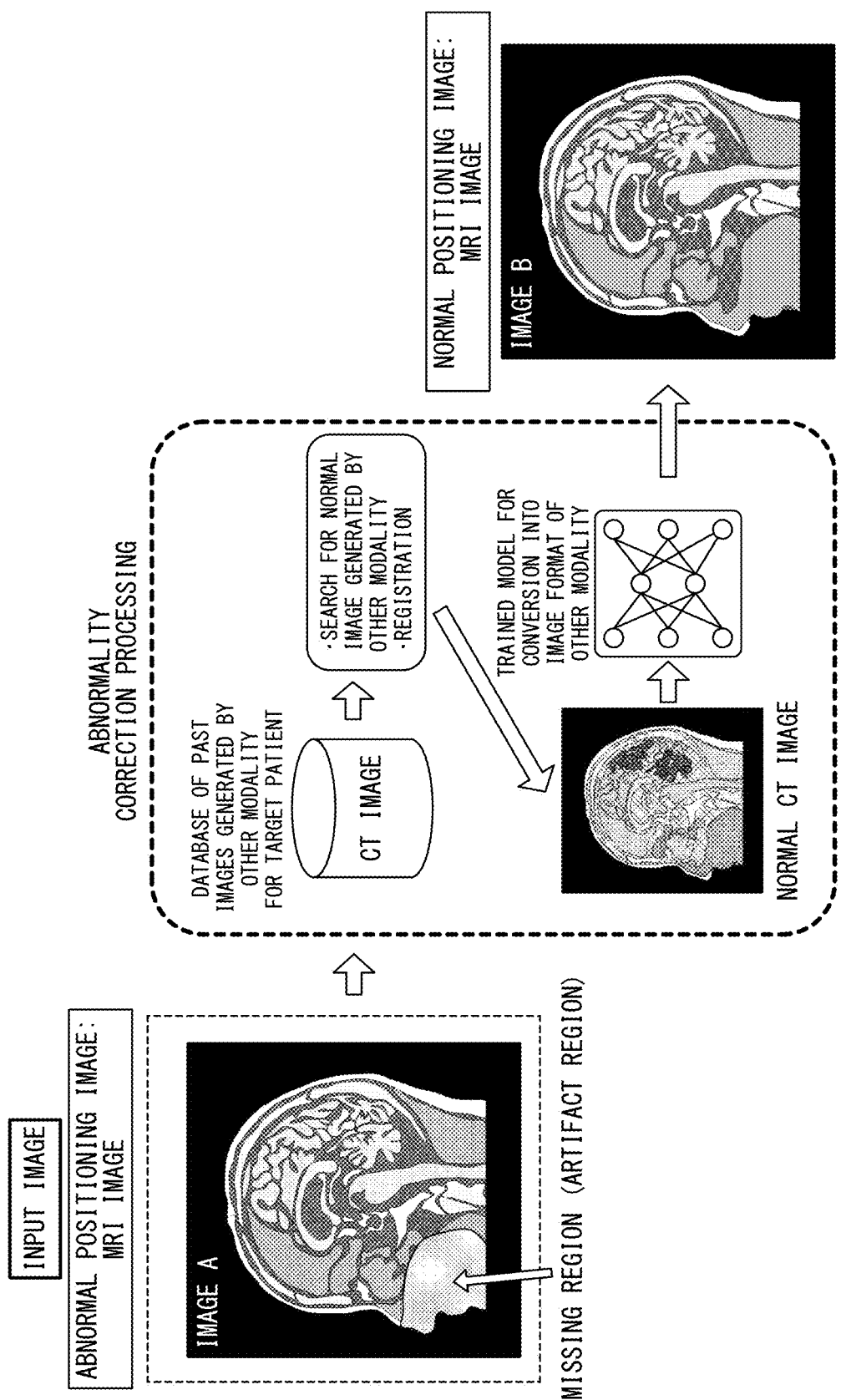
FIG. 10 is a schematic diagram illustrating the concept of the abnormality correction processing according to the third example.

FIG. 10 is a schematic diagram illustrating the concept of the abnormality correction processing according to the third example. In the third example, the abnormality correction processing is performed by using an image database of different modalities and a trained model for modality conversion.

The image database of different modalities is an image database for storing a plurality of past normal images that are generated by imaging the object using a modality apparatus different from the modality apparatus generating the abnormal positioning image in the step ST101.

When the modality apparatus generating the abnormal positioning image in the step ST101 is the MRI apparatus 1, the image database of different modalities is an image database that stores a plurality of past normal images of the same object imaged by using at least one of an X-ray CT apparatus, an X-ray angiography apparatus, or an ultrasonic diagnostic apparatus.

The trained model for modality conversion is a trained model that converts an image generated by a different modality apparatus into an image format of the modality apparatus that generates the abnormal positioning image in the step ST101.

When the modality apparatus that generates the abnormal positioning image in the step ST101 is the MRI apparatus 1 and the images stored in the image database of different modalities are generated by an X-ray CT apparatus, the trained model for modality conversion is a trained model that has been trained to convert a CT image into an MR image.

In the abnormality correction processing according to the third example, the processing circuitry 40 searches the image database of different modalities to extract the normal image (for example, CT image) corresponding to the abnormal positioning image (for example, MR image). A normal positioning image in the MR-image format is generated from an abnormal positioning image in the MR-image format by inputting the extracted normal image (in a different format) into the trained model for modality conversion, and the outputted image, which has been converted into the MR-image format by the trained model for modality conversion, is treated as a normal positioning image.

When misregistration or misalignment is present between the abnormal positioning image generated in the step ST101 and the normal positioning image extracted from the image database of different modalities, the extracted normal positioning image may be subjected to alignment processing (or registration processing) so as to positionally match the abnormal positioning image, similarly to the second example.

Figure 11:
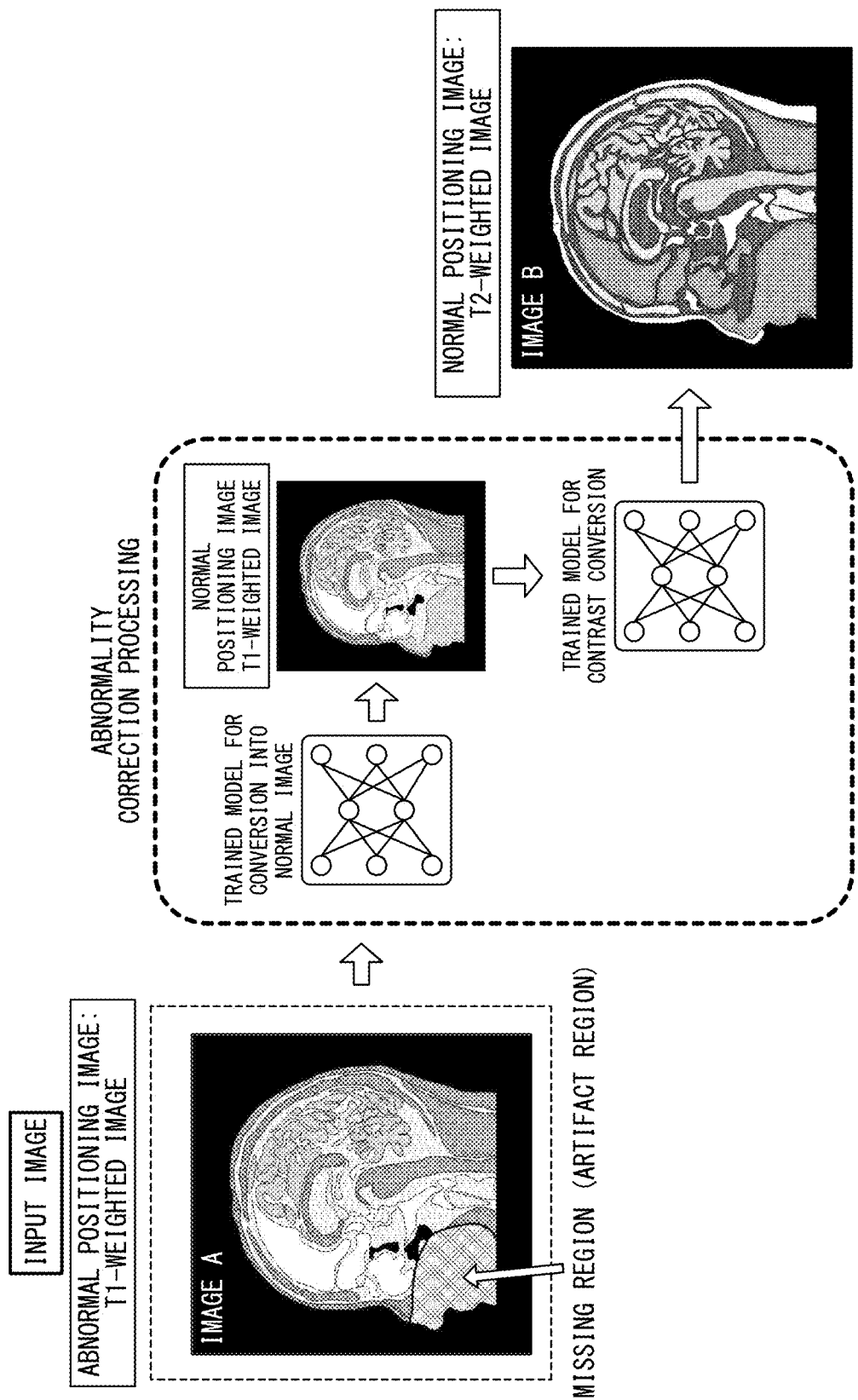
FIG. 11 is a schematic diagram illustrating the concept of the abnormality correction processing according to the fourth example.

FIG. 11 is a schematic diagram illustrating the concept of the abnormality correction processing according to the fourth example. In the fourth example, a first trained model and a second trained model are used in combination to perform the abnormality correction processing.

The first trained model is a trained model for conversion into a normal image. The first trained model is configured to convert the abnormal positioning image generated in the step ST101 into a normal positioning image, and is practically the same as the trained model used in the first example.

The second trained model is a trained model for contrast conversion. The second trained model is configured to convert the contrast of the converted normal positioning image from a first contrast to a second contrast that is different from the first contrast.

The first contrast may be the contrast of the abnormal positioning image generated in the step ST101, and may be the contrast corresponding to the imaging method used for generating this positioning image. For example, when the positioning image generated in the step ST101 is generated by a T1-weighted imaging method, the first contrast is the contrast corresponding to the T1-weighted imaging method. In this case, in the image having the first contrast, fat components are depicted as pixels having higher signal intensity while water components such as cerebrospinal fluid and blood are depicted as pixels having lower signal intensity.

The second contrast to be converted from the first contrast by the trained model for contrast conversion is, for example, the contrast corresponding to a T2-weighted imaging method. In this case, in the image having the second contrast, fat components are depicted as pixels having lower signal intensity and water components such as cerebrospinal fluid and blood are depicted as pixels having higher signal intensity.

In the abnormality correction processing of the fourth example, the first and second trained models generate the normal positioning image having the second contrast from the abnormal positioning image having the first contrast.

For example, when the first contrast is the contrast corresponding to the T1-weighted image, the second contrast is the contrast corresponding to the T2-weighted image. Conversely, when the first contrast is the contrast corresponding to the T2-weighted image, the second contrast is the contrast corresponding to the T1-weighted image.

In the fourth example, detection of the anatomical structures (or anatomical feature points) is performed on the normal positioning image having the second contrast.

In imaging of specific anatomical parts such as the abdomen, specific blood vessels and their branching points are the anatomical structures (or anatomical feature points) for determining the desired imaging plane in some cases. However, it is known that the specific blood vessels and their branching points are depicted as pixels having indistinguishably low signal intensity in the T1-weighted image based on its contrast but are depicted as pixels having high signal intensity in the T2-weighted image based on its contrast.

In such a case, when the positioning image generated in the step ST101 is a T1-weighted image, the anatomical structures (or anatomical feature points) cannot be satisfactorily detected, which is inconvenient. However, in the fourth example, even when the positioning image generated in the step ST101 is a T1-weighted image, this T1-weighted image can be converted into a normal positioning image in a format of a T2-weighted image, and thus, the anatomical structures (or anatomical feature points) can be satisfactorily detected.

Although the conversion from a T1-weighted image into a T2-weighted image has been described as one examples of contrast conversion, various examples of contrast conversion are conceivable, such as conversion from a non-fat-suppressed image into a fat-suppressed image and conversion from a non-diffusion-weighted image into a diffusion-weighted image.

The normal positioning images generated by the above-described abnormality correction processing of the first to fourth examples (i.e., each "Image B" illustrated in FIG. 8 to FIG. 11) are meant for showing the concept of the processing to be performed in the processing circuitry 40 and are not displayed on the display 42 in usual cases.

However, in addition to the "Image A", the "Image B" illustrated in FIG. 8 to FIG. 11 may be displayed on the display screen DS1 of the display 42 as the input image and the "Image E" as the output image. Displaying the "Image B" on the display 42 provides the user with the image from which the anatomical structures (or anatomical feature points) are directly detected.

Figure 12:
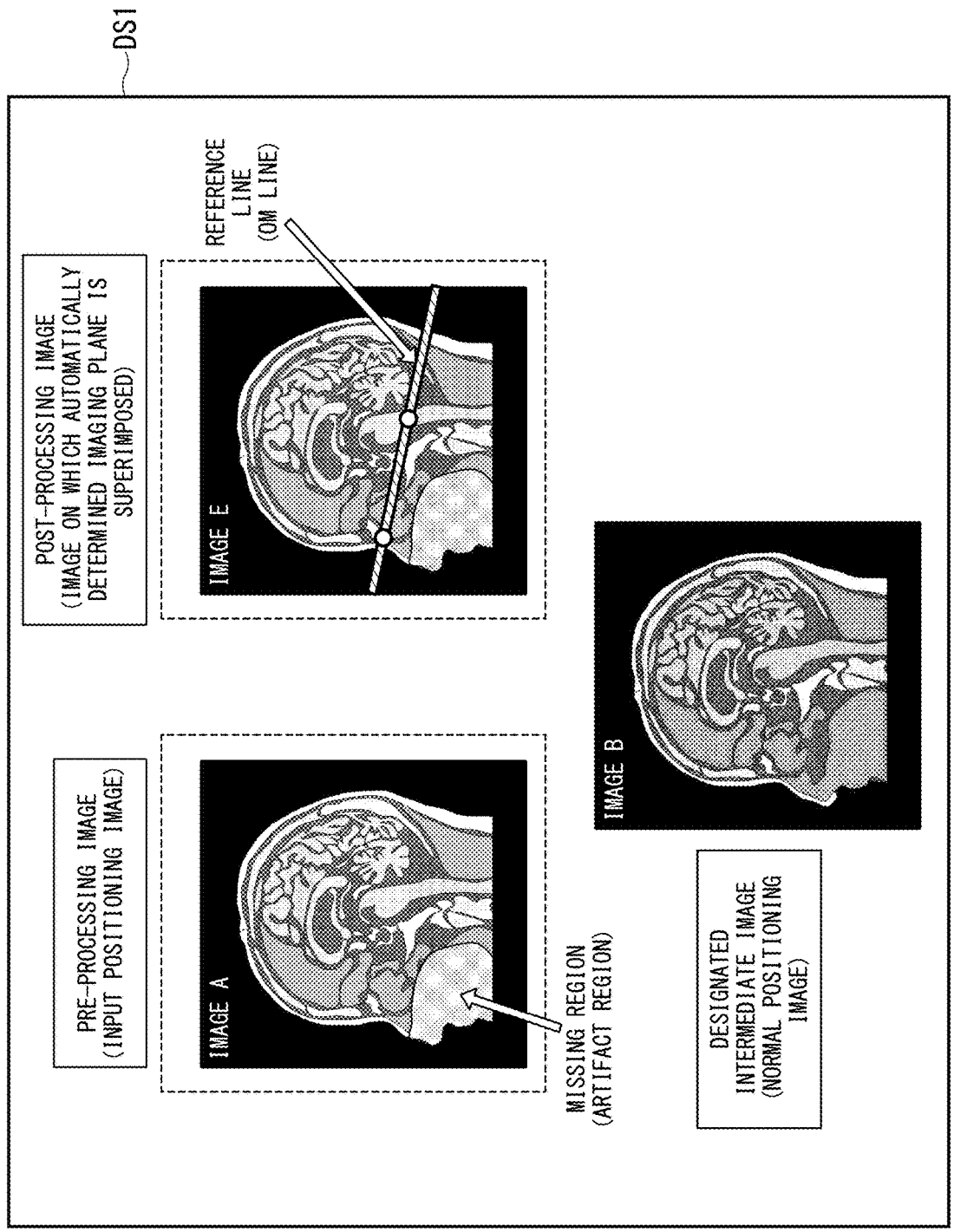
FIG. 12 is a schematic diagram illustrating a display aspect on a screen of a display.

FIG. 12 illustrates an example in which the display screen DS1 of the display 42 displays three images including: (a) the abnormal positioning image generated in the step ST101, i.e., the positioning image ("image A") before being subjected to processing; (b) the imaging-plane-determined image ("image E"), i.e., an imaging-plane-superimposed image in which the determined imaging plane or the reference line for defining the imaging plane is superimposed on the positioning image; and (c) the intermediate image corrected in the abnormality correction processing, i.e. the normal positioning image ("image B").

As described above, the medical image diagnostic apparatus of each embodiment can correctly determine standard imaging planes and/or reference lines for defining these imaging planes for the diagnostic scan without extra time and/or effort regardless of whether the positioning image is normal or abnormal.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

What is claimed is:

1. A medical image diagnostic apparatus, comprising:
a scanner configured to perform a pre-scan of an object and a diagnostic scan of the object after the pre-scan;
processing circuitry configured to
generate a positioning image from data acquired by the pre-scan and a diagnostic image from data acquired by the diagnostic scan,
generate a normal positioning image from the generated positioning image when the generated positioning image is an abnormal positioning image having an abnormality, the normal positioning image being an image in which the abnormality is corrected, and
determine an imaging plane of the diagnostic scan from the normal positioning image,
an image database that stores a plurality of images generated by using a different modality apparatus for imaging the object, the different modality apparatus being different in imaging method from a modality apparatus generating the abnormal positioning image; and a trained model that converts an input image generated by the different modality apparatus into an output image in a format of the modality apparatus generating the abnormal positioning image, wherein the processing circuitry is further configured to
search the image database for a normal image corresponding to the abnormal positioning image,
input the normal image from the database search into the trained model, and
generate the normal positioning image from the abnormal positioning image, an image outputted from the trained model being treated as the normal positioning image.

2. The medical image diagnostic apparatus according to claim 1, wherein the processing circuitry is further configured to:

detect a plurality of anatomical feature points of the object from the normal positioning image; and determine the imaging plane to be used for the diagnostic scan based on the plurality of detected anatomical feature points.

3. The medical image diagnostic apparatus according to claim 2, wherein the processing circuitry is further configured to determine the imaging plane to be used for the diagnostic scan based on a specific anatomical reference imaging plane designated by a user or a specific anatomical reference line designated by the user, and a plurality of detected anatomical feature points.

4. The medical image diagnostic apparatus according to claim 1, further comprising a display, wherein the processing circuitry is further configured to cause the display to display:
an imaging-plane-determined image in which a determined imaging plane or a reference line defining the imaging plane is superimposed on the positioning image; and
the normal positioning image generated from the abnormal positioning image.

5. The medical image diagnostic apparatus according to claim 1, wherein the medical image diagnostic apparatus is configured as an MRI apparatus.

6. The medical image diagnostic apparatus according to claim 1, wherein:

the modality apparatus generating the abnormal positioning image is an MRI a Magnetic Resonance Imaging (MRI) apparatus; and the different modality apparatus is at least one of an X-ray CT apparatus, an X-ray angiography apparatus, and an ultrasonic diagnostic apparatus.

7. A medical image diagnostic apparatus, comprising:

a scanner configured to perform a pre-scan of an object and a diagnostic scan of the object after the pre-scan;

processing circuitry configured to
generate a positioning image from data acquired by the pre-scan and a diagnostic image from data acquired by the diagnostic scan,
generate a normal positioning image from the generated positioning image when the generated positioning image is an abnormal positioning image having an abnormality, the normal positioning image being an image in which the abnormality is corrected, and
determine an imaging plane of the diagnostic scan from the normal positioning image;

a first trained model that converts the abnormal positioning image into the normal positioning image; and a second trained model that converts a contrast of the converted normal positioning image from a first contrast into a second contrast different from the first contrast, wherein the processing circuitry is further configured to generate the normal positioning image having the second contrast from the abnormal positioning image having the first contrast by applying the first trained model and the second trained model.

8. The medical image diagnostic apparatus according to claim 7, wherein the first contrast is a contrast corresponding to a T1-weighted image and the second contrast is a contrast corresponding to a T2-weighted image.

9. The medical image diagnostic apparatus according to claim 7, wherein the first contrast is a contrast corresponding to a T2-weighted image and the second contrast is a contrast corresponding to a T1-weighted image.

* * * * *